United States Patent
Jia et al.

(10) Patent No.: US 11,481,318 B2
(45) Date of Patent: Oct. 25, 2022

(54) METHOD AND APPARATUS, AND STORAGE SYSTEM FOR TRANSLATING I/O REQUESTS BEFORE SENDING

(71) Applicant: Huawei Technologies Co., Ltd., Shenzhen (CN)

(72) Inventors: Bei Jia, Shenzhen (CN); Bo Liu, Hangzhou (CN); Chengjian Bao, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 17/135,560

(22) Filed: Dec. 28, 2020

(65) Prior Publication Data

US 2021/0117316 A1    Apr. 22, 2021

Related U.S. Application Data

(63) Continuation of application No. PCT/CN2019/085467, filed on May 5, 2019.

(30) Foreign Application Priority Data

Jun. 29, 2018    (CN) .......................... 201810713188.2

(51) Int. Cl.
*G06F 12/02* (2006.01)
*G06F 13/16* (2006.01)

(52) U.S. Cl.
CPC ...... *G06F 12/0246* (2013.01); *G06F 12/0253* (2013.01); *G06F 13/1668* (2013.01); *G06F 2212/214* (2013.01); *G06F 2212/7211* (2013.01)

(58) Field of Classification Search
CPC ............ G06F 12/0246; G06F 12/0253; G06F 13/1668; G06F 2212/214;
(Continued)

(56) References Cited

U.S. PATENT DOCUMENTS 9,977,732 B1\*  5/2018  Keeler ................ G06F 12/0802
2010/0091018 A1\*  4/2010  Tatarchuk ............ G06T 15/005
345/423

(Continued)

FOREIGN PATENT DOCUMENTS

CN         101630233 A      1/2010
CN         102541760 A      7/2012

*Primary Examiner* — Tasnima Matin
(74) *Attorney, Agent, or Firm* — Leydig, Voit & Mayer, Ltd.

(57) ABSTRACT

A data processing method and a corresponding system are provided. The method is implemented by a processor and includes: obtaining a to-be-processed I/O request, where the to-be-processed I/O request may include a first address, and the first address is a logical address of to-be-read, to-be-written, or to-be-erased data in a target SSD; performing address translation on the to-be-processed I/O request based on an FTL mapping table, to translate the first address into a second address, where the second address is used to indicate a physical address of the to-be-read, to-be-written, or to-be-erased data in the target SSD, and the FTL mapping table may be used to record a translation relationship between physical addresses and logical addresses in the n SSDs; sending a to-be-processed I/O request obtained after address translation is performed; and after a sleep duration is preset, querying a processing result of the to-be-processed I/O request.

20 Claims, 5 Drawing Sheets

(58) Field of Classification Search
CPC ..... G06F 2212/7211; G06F 2212/7201; G06F 3/06; G06F 3/0611; G06F 3/0659; G06F 3/0674
See application file for complete search history.

(56) References Cited

U.S. PATENT DOCUMENTS

| | | | |
|---|---|---|---|
| 2010/0211939 A1* | 8/2010 | Ali | G06F 8/42 717/143 |
| 2011/0270857 A1* | 11/2011 | Bommireddipalli | G06F 21/62 707/758 |
| 2013/0332650 A1 | 12/2013 | Kandiraju et al. | |
| 2014/0379959 A1* | 12/2014 | Canepa | G06F 3/0608 711/103 |
| 2015/0019797 A1* | 1/2015 | Huang | G06F 3/0679 711/103 |
| 2017/0344573 A1* | 11/2017 | Eom | G06F 16/162 |
| 2018/0143897 A1* | 5/2018 | Shani | G06F 11/3692 |
| 2018/0210675 A1* | 7/2018 | Tang | G06F 12/0246 |
| 2019/0129841 A1* | 5/2019 | Kanno | G06F 12/0292 |

\* cited by examiner

METHOD AND APPARATUS, AND STORAGE SYSTEM FOR TRANSLATING I/O REQUESTS BEFORE SENDING

CROSS-REFERENCE TO RELATED APPLICATIONS

This application is a continuation of International Application No. PCT/CN2019/085467, filed on May 5, 2019, which claims priority to Chinese Patent Application No. 201810713188.2, filed on Jun. 29, 2018. The disclosures of the aforementioned applications are hereby incorporated by reference in their entireties.

TECHNICAL FIELD

Embodiments of this application relate to the field of storage technologies, and in particular, to a data processing method and apparatus, and a storage system.

BACKGROUND

In the field of storage technologies, a hard disk drive and a solid-state drive (SSD) are usually used to carry data. With advantages such as high performance, a low latency, low power consumption, and strong environment adaptability, the SSD is widely applied.

A conventional storage system usually includes a processor and an SSD. After obtaining an input/output (I/O) request, the processor may process the I/O request together with the SSD, and obtain a processing result of the I/O request. For example, the processor may send the I/O request to the SSD. In this way, after receiving the I/O request, a controller of the SSD translates, based on a flash translation layer (FTL) mapping table, a logical address carried in the I/O request into a physical address in the SSD. Then, the controller of the SSD may write, according to the I/O request, data into a storage area corresponding to the physical address, read data in a storage area corresponding to the physical address, or erase data in a storage area corresponding to the physical address, and feed back a final processing result of the I/O request to the processor. It should be noted that after sending the I/O request to the SSD, the processor repeatedly queries, after a fixed sleep duration, whether the SSD feeds back the processing result of the I/O request, until the processing result is found, and performs corresponding processing on the processing result. However, because a process of processing an I/O request by a conventional SSD is relatively complex, a time period required by the SSD to process the I/O request is relatively long. As a result, the sleep duration is often shorter than the time period required by the SSD to process the I/O request. Further, the processor needs to spend a long time period to repeatedly query the processing result, resulting in low data processing efficiency.

SUMMARY

This application provides a data processing method and apparatus, and a storage system, to resolve a problem of relatively low data processing efficiency. The technical solutions are as follows:

According to a first aspect, this application provides a data processing method. The method may include: first obtaining, by a processor, a to-be-processed I/O request, where the to-be-processed I/O request may include a first address of to-be-read, to-be-written, or to-be-erased data, the first address is a logical address of the to-be-read, to-be-written, or to-be-erased data in a target SSD, and the target SSD is any one of n SSDs connected to the processor, where n≥1; then performing, by the processor, address translation on the to-be-processed I/O request based on an FTL mapping table, to translate the first address into a second address, where the second address is used to indicate a physical address of the to-be-read, to-be-written, or to-be-erased data in the target SSD, and the FTL mapping table may be used to record a translation relationship between physical addresses and logical addresses in the n SSDs; and finally sending, by the processor to the target SSD based on the second address, a to-be-processed I/O request obtained after address translation is performed, and after a sleep duration is preset, querying a processing result of the to-be-processed I/O request.

Before sending the to-be-processed I/O request to an SSD, the processor performs address translation on the I/O request based on the FTL mapping table. Therefore, after receiving the I/O request, the SSD does not need to perform address translation on the I/O request. This reduces a duration for processing each I/O request by the SSD, and reduces a probability that a duration required by the SSD to process the I/O request is longer than the sleep duration. Further, a probability that the processor needs to spend a relatively long time period repeatedly querying the processing result is reduced, and data processing efficiency is improved. In addition, in a conventional technology, the duration for processing the I/O request by the SSD is far longer than the sleep duration of the processor. Therefore, frequently querying the processing result of the I/O request by the processor occupies a relatively large quantity of resources of the processor. This affects a processing capability of the processor. However, in this application, the probability that the processor needs to spend a relatively long time period repeatedly querying the processing result is reduced. This can reduce resource occupation of the processor, and lessen impact on the processing capability of the processor.

In a possible implementation, the FTL mapping table may be further used to record whether data is stored in storage pages in the n SSDs and whether the data stored in the storage pages is valid data. A process in which the processor obtains the to-be-processed I/O request may include: after receiving a user I/O request, determining, by the processor, that the user I/O request is the to-be-processed I/O request; further determining, by the processor based on the FTL mapping table, whether at least one SSD in the n SSDs currently needs to perform GC processing; and when determining that an SSD in the at least one SSD needs to perform the GC processing, generating, by the processor, an I/O request used to indicate to perform the GC processing on the SSD, and determining the generated I/O request as the to-be-processed I/O request.

In the conventional technology, after obtaining the to-be-processed I/O request, the processor sends the I/O request to the SSD, determines the duration for processing the I/O request by the SSD, and uses the duration as the sleep duration. Further, the processor starts to query the processing result of the I/O request after the sleep duration. However, before receiving the I/O request, the SSD may further need to process the I/O request that is generated in the SSD and that is used to indicate to perform the GC processing. After receiving the to-be-processed I/O request sent by the processor, the SSD cannot process the to-be-processed I/O request immediately. As a result, the sleep duration of the processor is far shorter than an actual duration in which the SSD feeds back the processing result to the processor. In this case, the processor needs to spend a relatively long time period querying the processing result of the to-be-processed I/O request. This consumes the resources of the processor. However, the FTL mapping table in this application is implemented at a user layer. Therefore, the processor may further determine, based on the FTL mapping table, whether the GC processing needs to be performed on the SSD, and when determining that the GC processing needs to be performed on the SSD, may generate the I/O request used to indicate to perform GC processing. It is ensured that all I/O requests sent by the processor to the SSD are the same as I/O requests actually processed by the SSD, so that after each to-be-processed I/O request is sent, the preset sleep duration of the processor is relatively accurate. In this way, after the sleep duration is preset, the processor can immediately query the processing result of the to-be-processed I/O request. This improves efficiency of finding the processing result by the processor, and reduces consumption of the resources of the processor.

In a possible implementation, the FTL mapping table may be further used to record a quantity of erasion times of storage blocks in the n SSDs. A process in which the processor obtains the to-be-processed I/O request may include: determining, by the processor based on the FTL mapping table at an interval of preset duration, whether the at least one SSD in the n SSDs currently needs to perform WL processing; and when determining that an SSD in the at least one SSD needs to perform the WL processing, generating, by the processor, an I/O request used to indicate to perform the WL processing on the SSD, and determining the generated I/O request as the to-be-processed I/O request.

In the conventional technology, after obtaining the to-be-processed I/O request, the processor sends the I/O request to the SSD, determines the duration for processing the I/O request by the SSD, and uses the duration as the sleep duration. Further, the processor starts to query the processing result of the I/O request after the sleep duration. However, before receiving the I/O request, the SSD may further need to process the I/O request that is generated in the SSD and that is used to indicate to perform WL processing. After receiving the to-be-processed I/O request sent by the processor, the SSD cannot process the to-be-processed I/O request immediately. As a result, the sleep duration of the processor is far shorter than an actual duration in which the SSD feeds back the processing result to the processor. In this case, the processor needs to spend a relatively long time period querying the processing result of the to-be-processed I/O request. This consumes the resources of the processor. However, the FTL mapping table in this application is implemented at a user layer. Therefore, the processor may further determine, based on the FTL mapping table, whether the WL processing needs to be performed on the SSD, and when determining that the WL processing needs to be performed on the SSD, may generate the I/O request used to indicate to perform WL processing. It is ensured that all I/O requests sent by the processor to the SSD are the same as I/O requests actually processed by the SSD, so that after each to-be-processed I/O request is sent, the preset sleep duration of the processor is relatively accurate. In this way, after the sleep duration is preset, the processor can immediately query the processing result of the to-be-processed I/O request. This improves efficiency of finding the processing result by the processor, and reduces consumption of the resources of the processor.

In a possible implementation, before the querying, by the processor, a processing result of the to-be-processed I/O request, the processor may further search preset durations corresponding to a plurality of request types for a duration corresponding to a type of the to-be-processed I/O request; and determine the duration corresponding to the type of the to-be-processed I/O request as the preset sleep duration. A duration corresponding to each request type is obtained through calculation based on a historical processing duration of an SSD for an I/O request of each request type.

A conventional SSD has different processing durations for I/O requests, and cannot ensure validity of the sleep duration. As a result, the sleep duration may be different from an actual processing duration of the SSD for the I/O requests. If the duration for processing the I/O requests by the SSD is far shorter than the sleep duration, in this case, the processor can query the processing result of the I/O request only after a current sleep duration ends. This prolongs the duration for obtaining the processing result of the I/O request by the processor. However, in this application, the processor can sleep at different durations based on different types of I/O requests, so that accuracy of the sleep duration can be improved, and the duration required by the processor to query the processing result of the I/O request can be reduced.

In a possible implementation, before the querying, by the processor, a processing result of the to-be-processed I/O request, the processor may further determine, based on the FTL mapping table, whether the target SSD needs to perform m pieces of preset processing before processing the to-be-processed I/O request, where the m pieces of preset processing include at least one of GC processing and WL processing, and m≥1. Then, the processor may determine a request set based on a determining result, where the request set may include the to-be-processed I/O request, and when the determining result is that the target SSD needs to perform at least one piece of preset processing before processing the to-be-processed I/O request, the request set may further include an I/O request used to indicate to perform each of the at least one piece of preset processing on the target SSD. Finally, the processor may search preset durations corresponding to a plurality of request types for a duration corresponding to a type of each I/O request in the request set, and determine a sum of durations corresponding to types of all I/O requests in the request set as the preset sleep duration. A duration corresponding to each request type is obtained through calculation based on a historical processing duration of an SSD for an I/O request of each request type.

The FTL mapping table in this application is implemented at the user layer. Therefore, the processor may further determine, based on the FTL mapping table, whether the target SSD needs to perform GC processing and/or WL processing before processing the to-be-processed I/O request. In addition, the preset sleep duration that the processor needs to wait may be determined based on processing that needs to be performed by the target SSD in the GC processing and the WL processing. In this way, accuracy of the preset sleep duration is improved, efficiency of finding the processing result by the processor is improved, and consumption of the resources of the processor is reduced.

In a possible implementation, the duration corresponding to each request type may be an arithmetic mean or a weighted mean of the historical processing durations of the SSD for the I/O request of each request type.

In a possible implementation, before sending the to-be-processed I/O request obtained after address translation is performed to the target SSD, the processor may further add the to-be-processed I/O request to a preset sending queue. After sending the to-be-processed I/O request obtained after address translation is performed to the target SSD, the processor may further add an identifier of the to-be-processed I/O request to a preset query queue. After finding the processing result of the to-be-processed I/O request, the processor may delete the identifier of the to-be-processed I/O request from the query queue. The sending queue includes an I/O request to be sent to an SSD, and the query queue includes an identifier of a target I/O request that has been sent to the SSD and for which no processing result is found. In this application, I/O requests are added to various queues, to sequentially send the I/O requests and sequentially query processing results of the I/O requests.

In a possible implementation, when adding the to-be-processed I/O request to the preset sending queue, the processor may first detect whether the to-be-processed I/O request meets a preset condition, where the preset condition includes: no I/O request that carries a same physical address as the to-be-processed I/O request exists in the sending queue. When determining that the to-be-processed I/O request meets the preset condition, the processor adds the to-be-processed I/O request to the sending queue.

The processor needs to compare the physical address carried in the to-be-processed I/O request with a physical address carried in an I/O request in each sending queue and a physical address carried in an I/O request in each query queue. If the processor determines that the physical address carried in the to-be-processed I/O request is different from both a physical address carried in each I/O request in each sending queue and a physical address carried in each I/O request in each query queue, the processor may determine that the to-be-processed I/O request meets the preset condition. To be specific, in this case, there is no other I/O request that is to be sent to the SSD and that is used to request to perform an operation of reading, writing, or erasing data on a same physical address as a currently detected to-be-processed I/O request. The currently detected to-be-processed I/O request and any I/O request in a plurality of sending queues can be sent to the SSD in parallel. In addition, a plurality of I/O requests are sent to the SSD in parallel. This can greatly improve efficiency of sending the I/O requests to the SSD.

In a possible implementation, a plurality of sending queues that one-to-one correspond to a plurality of request types and a plurality of query queues that one-to-one correspond to the plurality of request types are preset in the processor. When adding the to-be-processed I/O request to a preset sending queue, the processor may add the to-be-processed I/O request to a sending queue corresponding to a type of the to-be-processed I/O request. When adding an identifier of the to-be-processed I/O request to a preset query queue, the processor may add the identifier of the to-be-processed I/O request to a query queue corresponding to the type of the to-be-processed I/O request. After sending each I/O request, the processor adds an identifier of the I/O request to a query queue corresponding to a type of the I/O request. Therefore, preset sleep durations that need to be waited for querying processing results of I/O requests in all query queues are the same. When each query queue includes identifiers of a plurality of I/O requests, the preset sleep durations need to be obtained only once.

In a possible implementation, before adding the to-be-processed I/O request to the preset sending queue, the processor may further add the to-be-processed I/O request to a detection queue, where the detection queue may be used to record the I/O request to be sent to the SSD. When the detection queue includes an I/O request used to indicate to perform GC processing and a user I/O request, the I/O request used to indicate to perform GC processing is placed in front of the user I/O request. To be specific, the I/O request used to indicate to perform GC processing is preferentially processed. In this way, the SSD can preferentially perform the GC processing subsequently, and the GC processing can increase available storage space of the SSD, so that the SSD has sufficient storage space when the SSD processes the user I/O request.

According to a second aspect, this application provides a data processing apparatus. The data processing apparatus includes modules for performing the data processing method according to any one of the first aspect or the possible implementations of the first aspect.

According to a third aspect, a storage system is provided. The storage system includes a processor, a memory, a communications interface, and a bus. The memory includes n SSDs, and the memory and a network interface are separately connected to the processor by using the bus. The processor is configured to execute an instruction stored in the memory, and the processor implements the data processing method in any one of the first aspect or the possible implementations of the first aspect by executing the instruction.

According to a fourth aspect, a computer-readable storage medium is provided. The computer-readable storage medium stores an instruction. When the instruction is run on a computer, the computer is enabled to perform the data processing method in any one of the first aspect or the possible implementations of the first aspect.

According to a fifth aspect, a computer program product including an instruction is provided. When the computer program product is run on a computer, the computer is enabled to perform the data processing method in any one of the first aspect or the possible implementations of the first aspect.

In this application, the implementations provided in the foregoing aspects may be further combined to provide more implementations.

This application provides a data processing method and apparatus, and a storage system. Before sending the to-be-processed I/O request to the SSD, the processor performs address translation on the I/O request based on the FTL mapping table. Therefore, after receiving the I/O request, the SSD does not need to perform address translation on the I/O request. This reduces a duration for processing each I/O request by the SSD, and reduces a probability that a duration required by the SSD to process the I/O request is longer than the sleep duration. Further, a probability that the processor needs to spend a relatively long time period repeatedly querying the processing result is reduced, and data processing efficiency is improved.

DESCRIPTION OF EMBODIMENTS

To make objectives, technical solutions, and advantages of embodiments of the present application clearer, the following further describes implementations of this application in detail with reference to accompanying drawings.

Figure 1:
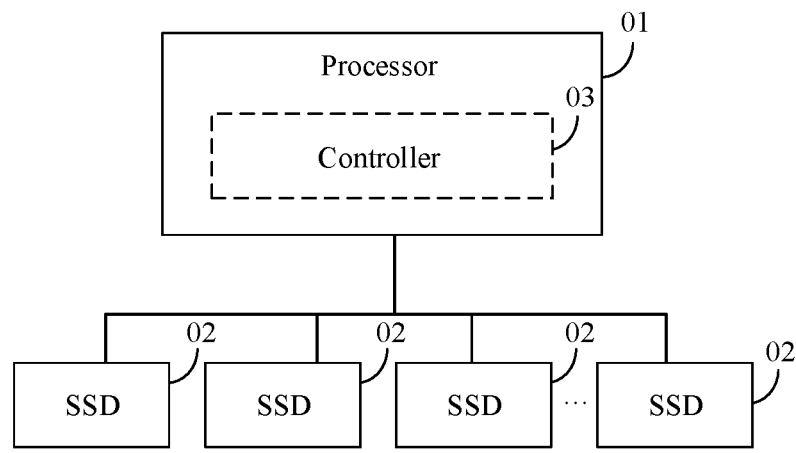
FIG. 1 is a schematic structural diagram of a storage system according to an embodiment of the present application.

FIG. 1 is a schematic structural diagram of a storage system 100 according to an embodiment of the present application. As shown in FIG. 1, the storage system 100 may include a processor 01, a memory (not shown in FIG. 1), a communications interface (not shown in FIG. 1), and a bus (not shown in FIG. 1). The memory may include n SSDs 02 and another storage module. The memory and a network interface may be separately connected to the processor 01 by using the bus, and the processor 01 is configured to execute an instruction stored in the memory. It should be noted that n≥1. In FIG. 1, an example in which the storage system 100 includes a plurality of SSDs 02 is used.

In this embodiment of the present application, the processor 01 implements a function of a controller of an SSD. The processor 01 may store a flash translation layer (FTL) mapping table mapping table, and the FTL mapping table may be used to record a translation relationship between physical addresses and logical addresses in the n SSDs 02. The processor 01 may implement the function of the controller 03 of the SSD based on the FTL mapping table.

It should be noted that the processor 01 may be a central processing unit, and the processor 01 may send an I/O request to the SSD 02. In this way, the SSD 02 performs an operation of reading, writing, or erasing data on a physical address in the SSD 02 based on the I/O request, obtains a processing result of the I/O request, and further feeds back the processing result to the processor 01.

Figure 2:
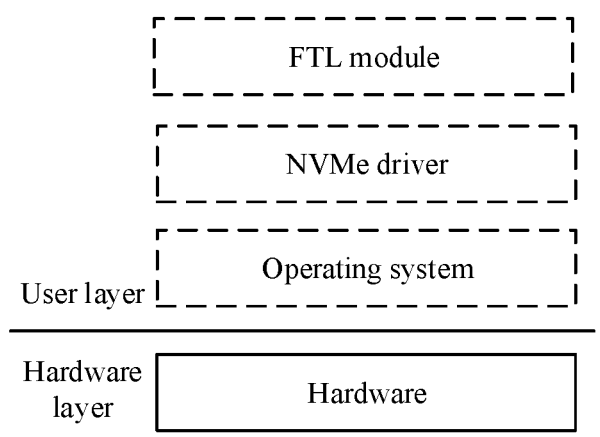
FIG. 2 is a schematic diagram of a protocol stack according to an embodiment of the present application.

The foregoing process may be represented by using a protocol stack. As shown in FIG. 2, the protocol stack may include a user layer and a hardware layer. The hardware layer includes hardware such as a processor and an SSD, and the user layer establishes an operating system running on the processor. The user layer includes a non-volatile memory host controller interface specification (NVMe) driver, the operating system, and an FTL module. The FTL module in the user layer may perform address translation on an I/O request based on an FTL mapping table, to translate a logical address in the I/O request into a physical address. The FTL module may further send an I/O request obtained after address translation is performed to the SSD at the hardware layer by using the NVMe driver. After obtaining a processing result of the I/O request, the SSD may feed back the processing result to the user layer by using the NVMe driver.

In a conventional technology, in a conventional data processing process, the controller of the SSD needs to complete translation from the logical address of the I/O request to the physical address. In addition, when querying the I/O request, the processor queries an execution result of the I/O request by using a fixed sleep duration until the I/O request is executed. The sleep duration is usually shorter than a duration for processing the I/O request by the SSD, and therefore the processor needs to spend a relatively long time period repeatedly querying whether the I/O request is completed. The entire data processing process is time-consuming, and efficiency is relatively low. An embodiment of the present application provides a data processing method, to reduce a probability that the processor needs to spend a relatively long time period repeatedly querying the processing result, and improve data processing efficiency.

Figure 3:
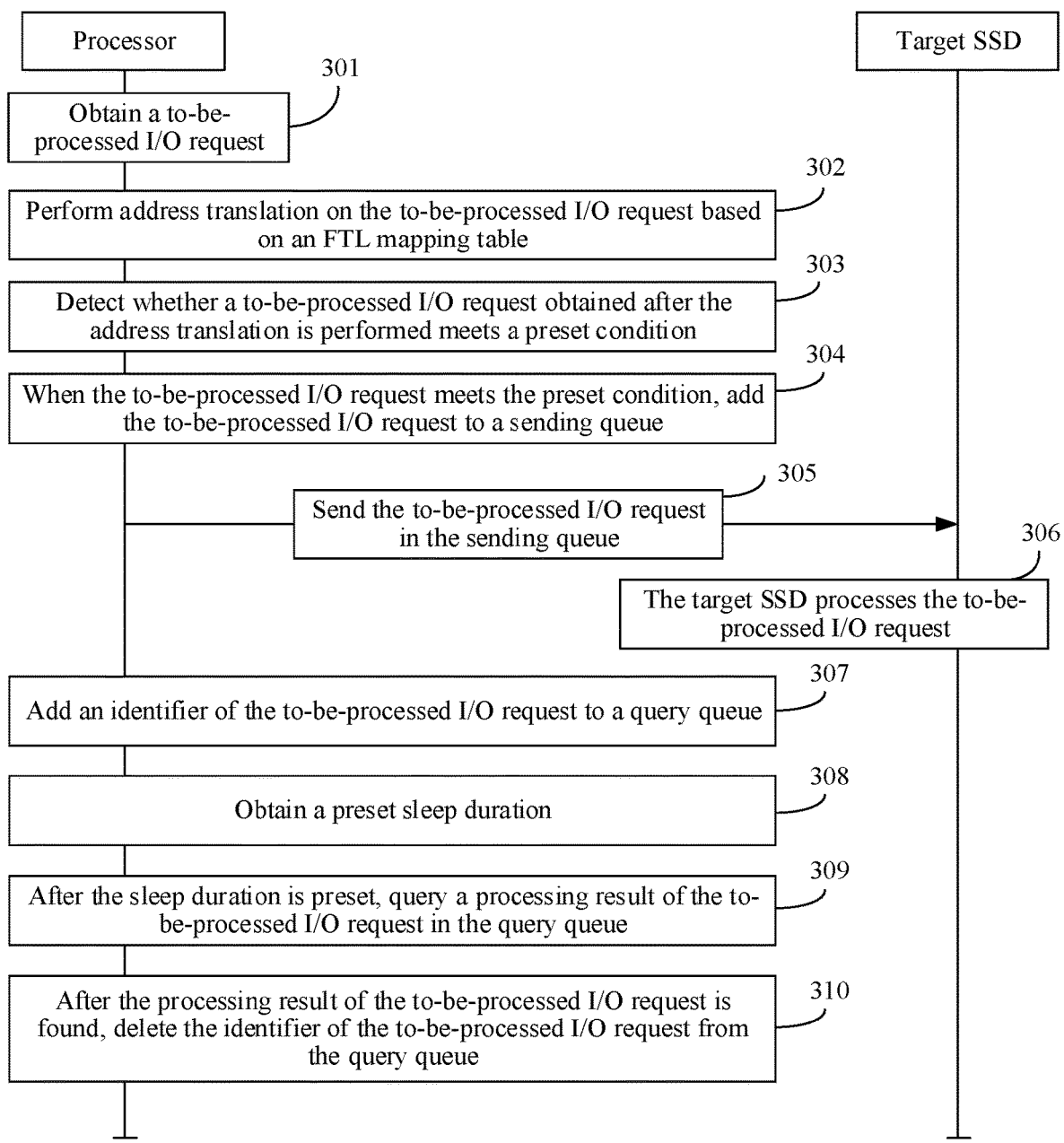
FIG. 3 is a flowchart of a data processing method according to an embodiment of the present application.

FIG. 3 is a flowchart of a data processing method according to an embodiment of the present application. The data processing method may be used for the storage system shown in FIG. 1. As shown in FIG. 3, the data processing method may include the following steps.

Step 301: A processor obtains a to-be-processed I/O request.

The to-be-processed I/O request may include a first address of to-be-read, to-be-written, or to-be-erased data, the first address is a logical address of the to-be-read, to-be-written, or to-be-erased data in a target SSD, and the target SSD is any one of n SSDs connected to the processor. The to-be-processed I/O request may be used to indicate to perform an operation of reading, writing, or erasing data on the first address in the target SSD.

Optionally, the to-be-processed I/O request obtained by the processor in step 301 may include at least one of a user I/O request and a system I/O request. That is, the to-be-processed I/O request may include the user I/O request, the system I/O request, or the user I/O request and the system I/O request.

The user I/O request may be an I/O request triggered by an operation performed by a user (namely, a person who uses a storage system) in the storage system, and may be specifically an I/O request sent by the user by using an application program in the storage system. Optionally, when the storage system further includes a virtual machine, the user I/O request may be an I/O request triggered by an operation performed by the user on the virtual machine. This is not limited in this embodiment of the present application.

The system I/O request may be an I/O request generated by the processor. The system I/O request may include an I/O request used to indicate to perform GC processing, and/or an I/O request used to indicate to perform WL processing.

For example, an FTL mapping table may be further used to record whether data is stored in storage pages in the n SSDs and whether the data stored in the storage pages is valid data. After receiving the user I/O request, the processor may determine, based on the FTL mapping table, whether at least one SSD in the n SSDs currently needs to perform the garbage collection (GC) processing. For example, the processor may determine whether each of the n SSDs currently needs to perform the GC processing. When determining that an SSD currently needs to perform the GC processing, the processor may generate the I/O request used to indicate to perform GC processing on the SSD, and use the I/O request as the to-be-processed I/O request. It should be noted that, when determining, based on the FTL mapping table, whether the SSD currently needs to perform the GC processing, an FTL module in the processor may determine, based on the FTL mapping table, a storage page that is in the SSD and on which no data is stored, and further determine a ratio of remaining storage space in a current SSD. When the remaining storage space is less than a preset storage space threshold (for example, 10% or 20%), it may be determined that the SSD currently needs to perform the GC processing. In addition, when performing the GC processing, the SSD may delete all data in a storage block in the SSD, and write data in a valid storage page in the storage block into another storage block, to delete invalid data in the SSD and increase the remaining storage space in the SSD.

For another example, the FTL mapping table may be further used to record a quantity of erasing times of storage blocks in then SSDs. The processor may further determine, based on the FTL mapping table at an interval of preset duration, whether at least one SSD in the n SSDs currently needs to perform the wear leveling (WL) processing; when determining that an SSD currently needs to perform the WL processing, may generate the I/O request used to indicate to perform WL processing on the SSD, and use the I/O request as the to-be-processed I/O request. When determining, based on the FTL mapping table, whether the SSD currently needs to perform the WL processing, an FTL module in the processor may determine a quantity of erasion times of each storage block in the SSD based on the FTL mapping table, and determine whether the quantity of erasion times is greater than a preset quantity threshold. When a quantity of erasion times of a storage block is greater than the preset quantity threshold, it may be determined that the storage block currently needs to perform the WL processing. In addition, when performing the WL processing, the SSD may transfer data in a storage block with a larger quantity of erasion times to a storage block with a smaller quantity of erasion times. In this way, quantities of erasion times of all storage blocks in the SSD is relatively balanced.

It should be noted that, in this embodiment of the present application, the step in which the processor determines whether the SSD needs to perform the GC processing may be performed after the processor obtains the user I/O request. That is, once the processor obtains the user I/O request, the processor can determine whether the at least one SSD in the n SSDs needs to perform the GC processing. The step in which the processor determines whether the at least one SSD in the n SSDs needs to perform the WL processing may be irrelevant to the step in which the processor obtains the user I/O request. That is, the processor does not trigger, after obtaining the user I/O request, the processor to perform the step of determining whether the SSD needs to perform the WL processing.

Step 302: The processor performs address translation on the to-be-processed I/O request based on the FTL mapping table.

After performing address translation on the to-be-processed I/O request, the processor may translate the first address in the to-be-processed I/O request into a second address, where the second address is used to indicate a physical address of the to-be-read, to-be-written, or to-be-erased data in the target SSD.

For example, the SSD includes a plurality of storage blocks, each storage block includes at least one storage page, each storage page includes a plurality of physical addresses, and each physical address is used to store data. The FTL mapping table is used to manage a translation relationship between physical addresses and logical addresses in the SSDs. The FTL mapping table in this embodiment of the present application may be implemented at a user layer. Therefore, after each time the processor obtains an I/O request, the FTL module in the processor may translate a logical address carried in the I/O request into a physical address in the SSD based on the FTL mapping table implemented at the user layer. The processor does not need to send the I/O request to the SSD for translation between the logical address and the physical address, thereby implementing address translation in advance.

Step 303: The processor detects whether a to-be-processed I/O request obtained after the address translation is performed meets a preset condition. If the to-be-processed I/O request meets the preset condition, step 304 is performed. If the to-be-processed I/O request does not meet the preset condition, step 303 is performed.

The preset condition may include: no I/O request that carries a same physical address as a currently detected to-be-processed I/O request exists in a sending queue of the processor. The sending queue may include an I/O request to be sent to the SSD.

Optionally, a plurality of sending queues that one-to-one correspond to a plurality of request types may be preset in the processor, and physical addresses of any two I/O requests in the plurality of sending queues are different. These I/O requests may be sent to the SSD in parallel, and the plurality of types may include a read type, a write type, and an erase type.

In step 303, the processor needs to compare the physical address carried in the to-be-processed I/O request with a physical address carried in an I/O request in each sending queue. If the processor determines that the physical address carried in the to-be-processed I/O request is different from a physical address carried in each I/O request in each sending queue, the processor may determine that the to-be-processed I/O request meets the preset condition. To be specific, in this case, there is no other I/O request that is to be sent to the SSD and that is used to request to perform an operation of reading, writing, or erasing data on a same physical address as the currently detected to-be-processed I/O request. The currently detected to-be-processed I/O request and any I/O request in the plurality of sending queues can be sent to the SSD in parallel.

In addition, if a to-be-processed I/O request does not meet the preset condition, it may be determined that the to-be-processed I/O request does not meet a condition for joining the sending queue, and step 303 may be repeatedly performed. That is, it is repeatedly determined whether the to-be-processed I/O request meets the preset condition. It can be determined that the to-be-processed I/O request meets the condition for joining the sending queue only when the to-be-processed I/O request meets the preset condition.

Step 304: The processor adds the to-be-processed I/O request to a sending queue.

After determining that the to-be-processed I/O request meets the preset condition, the processor may add the to-be-processed I/O request to a sending queue corresponding to a type of the to-be-processed I/O request. For example, in step 304, the processor may first determine the type (for example, the read type) of the to-be-processed I/O request, and search the plurality of sending queues for the sending queue corresponding to the type of the to-be-processed I/O request. Finally, the to-be-processed I/O request is added to the sending queue corresponding to the type of the to-be-processed I/O request (for example, a sending queue corresponding to the read type).

Figure 4:
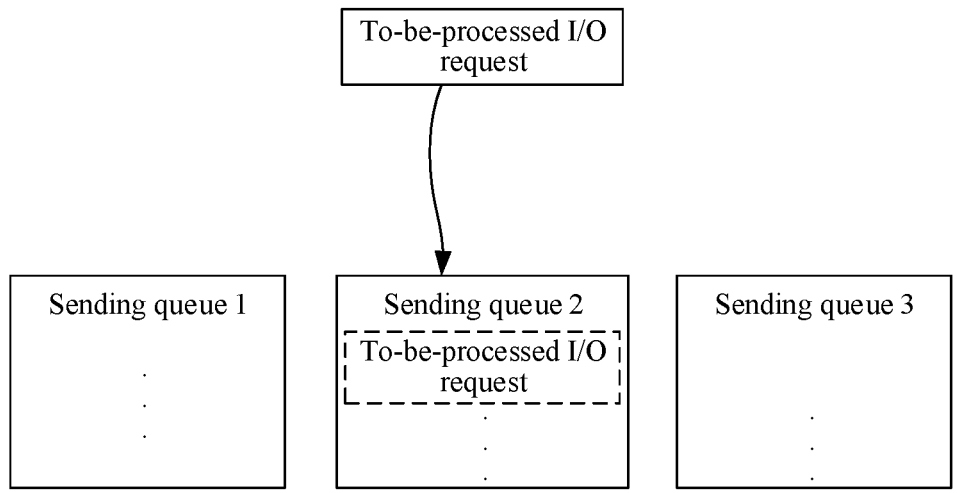
FIG. 4 is a schematic diagram of a sending queue according to an embodiment of the present application.

As shown in FIG. 4, it is assumed that the plurality of sending queues include a sending queue 1 corresponding to the read type, a sending queue 2 corresponding to the write type, and a sending queue 3 corresponding to the erase type. If the type of the to-be-processed I/O request is the write type, when the to-be-processed I/O request meets the preset condition, the to-be-processed I/O request may be added to the sending queue 2 corresponding to the write type.

Step 305: The processor sends the to-be-processed I/O request in the sending queue to the target SSD.

The target SSD is an SSD that is indicated by the second address in the to-be-processed I/O request and that is in the n SSDs. It should be noted that because physical addresses carried in I/O requests in the plurality of sending queues are different, the I/O requests in the plurality of sending queues may be sent to the SSD in parallel. In other words, the processor may simultaneously send the I/O requests in the plurality of sending queues, and I/O requests in each sending queue may be sequentially sent. This can greatly improve efficiency of sending the I/O requests to the SSD.

After receiving the to-be-processed I/O request, the target SSD may process the to-be-processed I/O request, for example, perform the operation of reading, writing, or erasing data on the second address in the to-be-processed I/O request. Then, the target SSD may further feed back a processing result of the to-be-processed I/O request to the processor. It should be noted that after the processor sends the to-be-processed I/O request to the target SSD, the to-be-processed I/O request is no longer recorded in the sending queue.

Step 306: The target SSD processes the to-be-processed I/O request.

After receiving the to-be-processed I/O request, the target SSD may perform the operation of reading, writing, or erasing data on the second address based on the second address (the physical address in the target SSD) in the to-be-processed I/O request, to process the to-be-processed I/O request.

It should be noted that a shared memory may be further preset in the storage system, and the shared memory is configured to store a processing result of each I/O request. After finishing processing the to-be-processed I/O request, the target SSD may feed back the processing result to the shared memory in the storage system. When subsequently querying the processing result of each I/O request, the processor may query the processing result in the shared memory.

Step 307: The processor adds an identifier of the to-be-processed I/O request to a query queue.

The query queue may be further preset in the processor. The query queue may include an I/O request that has been sent to the SSD and for which no processing result is found.

Optionally, a plurality of query queues that one-to-one correspond to the plurality of request types may be preset in the processor. After sending the to-be-processed I/O request to the target SSD, the processor may add the identifier of the to-be-processed I/O request to a query queue corresponding to the type of the to-be-processed I/O request.

Figure 5:
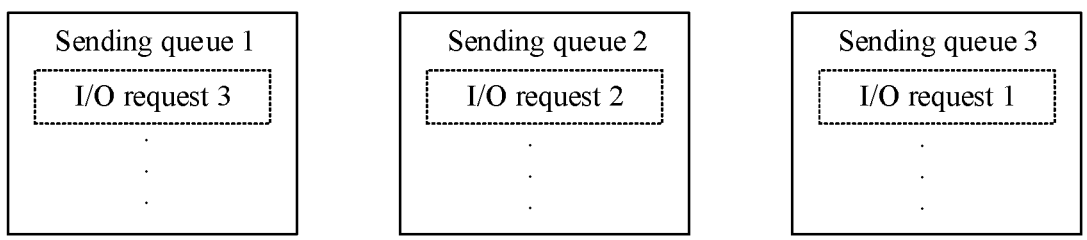
FIG. 5 is a schematic diagram of a sending queue and a query queue according to an embodiment of the present application.
Figure 5:
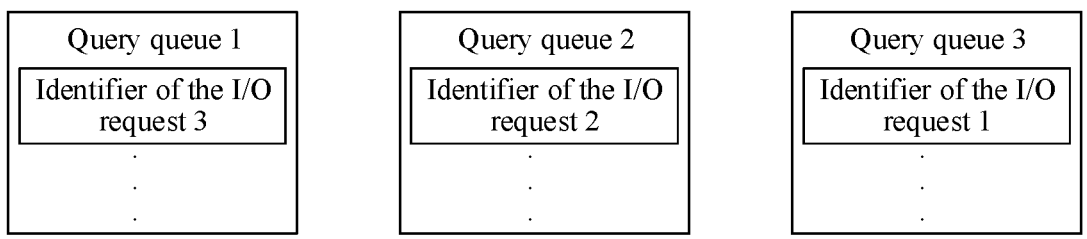

As shown in FIG. 5, both the sending queue 1 and a query queue 1 correspond to the read type, both the sending queue 2 and a query queue 2 correspond to the write type, and both the sending queue 3 and a query queue 3 correspond to the erase type. After an I/O request 3 in the sending queue 1 is sent to the SSD, the I/O request 3 is no longer recorded in the sending queue 1, and the processor needs to add an identifier of the I/O request 3 to the query queue 1. After an I/O request 2 in the sending queue 2 is sent, the I/O request 2 is no longer recorded in the sending queue 2, and the processor needs to add an identifier of the I/O request 2 to the query queue 2. After an I/O request 1 in the sending queue 3 is sent, the I/O request 1 is no longer recorded in the sending queue 3, and the processor needs to add an identifier of the I/O request 1 to the query queue 3.

Step 308: The processor obtains a preset sleep duration.

A duration corresponding to the plurality of request types may be preset in the processor. The preset sleep duration may be implemented in any one of the following manners.

Manner 1: Maintenance personnel manually set the preset sleep duration based on an empirical value.

Manner 2: An average I/O request duration is determined based on a historical duration of an I/O request processing process in the storage system, and the preset sleep duration is determined accordingly.

For example, a preset sleep duration corresponding to each request type may be obtained through calculation based on a historical processing duration of the SSD for an I/O request of the request type. For example, the duration corresponding to each request type is an arithmetic mean or a weighted mean of the historical processing durations of the SSD for the I/O request of the request type. For example, it is assumed that historical processing durations of the SSD for three I/O requests of a request type is respectively 1.5 seconds, 2 seconds, and 2.5 seconds. In this case, the processor may use a mean, namely, 2 seconds, of 1.5 second, 2 seconds, and 2.5 seconds as an arithmetic mean of the historical processing durations of the SSD for the I/O requests of the request type. Further, if a weight of 1.5 seconds is 2, a weight of 2 seconds is 5, and a weight of 2.5 seconds is 3, in this case, the processor may use a weighted mean, namely, 2.5 seconds, of 1 second, 2 seconds, and 2.5 seconds as a weighted mean of the historical processing durations of the SSD for the I/O requests of the request type.

Optionally, in the manner 2, preset sleep durations corresponding to the plurality of request types may be recalculated based on a latest historical processing duration, and may be periodically updated.

Optionally, after sending each I/O request, the processor adds an identifier of the I/O request to a query queue corresponding to a type of the I/O request. Therefore, I/O requests in each query queue are I/O requests of a same request type, and a preset sleep duration that needs to be waited for querying processing results of the I/O requests in each query queue is the same. When each query queue includes identifiers of a plurality of I/O requests, the preset sleep duration needs to be obtained only once.

It should be noted that, if the processor does not determine, based on the FTL mapping table in step 301, whether the SSD needs to perform GC processing and WL processing, to be specific, the to-be-processed I/O request obtained in step 301 includes only the user I/O request, a process in which the processor determines the preset sleep duration may further be as follows: The processor determines, based on the FTL mapping table, whether the target SSD needs to perform m pieces of preset processing before the target SSD processes the to-be-processed I/O request, where the m pieces of preset processing include at least one of the GC processing and the WL processing, and m≥1. Then, the processor may determine a request set based on a determining result, where the request set may include the to-be-processed I/O request, and when the determining result is that the target SSD needs to perform at least one piece of preset processing, the request set further includes an I/O request used to indicate to perform each of the at least one piece of preset processing on the target SSD. After determining the request set, the processor may further search, in preset durations corresponding to a plurality of request types, for a duration corresponding to each type of I/O request in the request set, add a sum of durations corresponding to all types of I/O requests in the request set, and determine the sum as the preset sleep duration. To be specific, the processor may further determine, based on the FTL mapping table, whether the target SSD needs to perform the GC processing and/or the WL processing before processing the to-be-processed I/O request. In addition, the preset sleep duration that the processor needs to wait may be determined based on processing that needs to be performed by the target SSD in the GC processing and the WL processing. In this way, accuracy of the preset sleep duration is improved, efficiency of finding the processing result by the processor is improved, and consumption of the resources of the processor is reduced.

Step 309: After the sleep duration is preset, query the processing result of the to-be-processed I/O request in the query queue.

After determining the preset sleep duration, the processor may shelve the to-be-processed I/O request, and after the sleep duration is preset, start to continuously query the processing result of the to-be-processed I/O request. In a process of shelving the to-be-processed I/O request, the processor may perform another operation unrelated to the to-be-processed I/O request, to effectively use the resources of the processor. In addition, because the SSD feeds back the processing result of the I/O request to the shared memory in the storage system, the processor may query the shared memory in the storage system for the processing result of the to-be-processed I/O request.

It should be noted that the storage system may further have an operating system, and the operating system may include a plurality of threads. The processor may perform each step by invoking a thread, and after a thread is invoked to send the to-be-processed I/O request, the processor may control the thread to sleep for the preset sleep duration, and wake up the thread after the preset sleep duration expires, to query the processing result of the to-be-processed I/O request.

It should be noted that in a conventional technology, after invoking a thread to send an I/O request to the SSD, the processor may further directly stop invoking the first thread, and switch the first thread to another thread. After obtaining a processing result of the I/O request, the SSD may send the processing result of the I/O request to the processor in an interrupt manner. In this case, the processor may switch from the another thread to the first thread. However, in a high-speed I/O scenario, the SSD can immediately feed back the processing result of the I/O request. In this way, frequent switching between threads by the processor is caused, and processing efficiency of the processor is affected. However, in this embodiment of the present application, if the SSD can immediately feed back the processing result of the I/O request, the preset sleep duration determined by the processor is usually relatively short. When the preset sleep duration is 0 seconds, after sending the I/O request to the SSD, the processor may immediately query the processing result of the I/O request without switching between a plurality of threads. This improves the processing efficiency of the processor.

In addition, in the conventional technology, after sending the I/O request to the SSD, the processor may not query the processing result after the sleep duration, but directly start to continuously query the processing result of the I/O request. In this way, the resources of the processor are wasted. However, in this embodiment of the present application, after sending the to-be-processed I/O request to the SSD, the processor may perform another operation and query the processing result of the to-be-processed I/O request after the sleep duration is preset. This can greatly improve utilization of the resources of the processor.

Step 310: After the processing result of the to-be-processed I/O request is found, delete the identifier of the to-be-processed I/O request from the query queue.

After finding the processing result that is of the to-be-processed I/O request and that is fed back by the SSD, the processor may remove the identifier of the to-be-processed I/O request from the query queue corresponding to the type of the to-be-processed I/O request, to ensure that an identifier of the I/O request that has been sent to the SSD and for which no processing result is found is always recorded in the query queue.

In addition, after querying a processing result of the user I/O request, the processor may further feed back the processing result of the user I/O request to the user.

In a possible embodiment, after step 302 and before step 303, the processor may further first add the to-be-processed I/O request obtained after address translation is performed to a preset detection queue. The detection queue may include an I/O request to be detected to determine whether the I/O request meets the preset condition. Then, in step 303, whether the to-be-processed I/O request in the detection queue meets the preset condition may be detected. In addition, when the detection queue includes the I/O request used to indicate to perform GC processing and the user I/O request, the I/O request used to indicate to perform GC processing may be placed in front of the user I/O request. To be specific, in this embodiment of the present application, the I/O request used to indicate to perform GC processing is preferentially processed. In this way, the SSD can preferentially perform the GC processing subsequently, and the GC processing can increase available storage space of the SSD, so that the SSD has sufficient storage space when the SSD processes the user I/O request.

In conclusion, in the data processing method provided in this embodiment of the present application, before sending the to-be-processed I/O request to the SSD, the processor performs address translation on the I/O request based on the FTL mapping table. Therefore, after receiving the I/O request, the SSD does not need to perform address translation on the I/O request. This reduces a duration for processing each I/O request by the SSD, and reduces a probability that a duration required by the SSD to process the I/O request is longer than the sleep duration. Further, a probability that the processor needs to spend a relatively long time period repeatedly querying the processing result is reduced, and data processing efficiency is improved. In the conventional technology, the duration for processing the I/O request by the SSD is far longer than the sleep duration of the processor. Therefore, frequently querying the processing result of the I/O request by the processor occupies a relatively large quantity of resources of the processor. This affects a processing capability of the processor. However, in this embodiment of the present application, the probability that the processor needs to spend a relatively long time period repeatedly querying the processing result is reduced. This can reduce resource occupation of the processor, and lessen impact on the processing capability of the processor. In addition, a conventional SSD has different processing durations for I/O requests, and cannot ensure validity of the sleep duration. As a result, the sleep duration may be different from an actual processing duration of the SSD for the I/O requests. If the duration for processing the I/O requests by the SSD is far shorter than the sleep duration, in this case, the processor can query the processing result of the I/O request only after a current sleep duration ends. This prolongs the duration for obtaining the processing result of the I/O request by the processor. However, in this embodiment of the present application, the processor can sleep at different durations based on different types of I/O requests, so that accuracy of the sleep duration can be improved, and the duration required by the processor to query the processing result of the I/O request can be reduced.

Further, in the conventional technology, after obtaining the to-be-processed I/O request, the processor sends the I/O request to the SSD, determines the duration for processing the I/O request by the SSD, and uses the duration as the sleep duration. Further, the processor starts to query the processing result of the I/O request after the sleep duration. However, before receiving the I/O request, the SSD may further need to process the system I/O request (for example, the I/O request used to indicate to perform GC processing, and/or the I/O request used to indicate to perform WL processing) that is generated in the SSD. After receiving the to-be-processed I/O request sent by the processor, the SSD cannot process the to-be-processed I/O request immediately. As a result, the sleep duration of the processor is far shorter than an actual duration in which the SSD feeds back the processing result to the processor. In this case, the processor needs to spend a relatively long time period querying the processing result of the to-be-processed I/O request. This consumes the resources of the processor. However, the FTL mapping table in this embodiment of the present application is implemented at the user layer. Therefore, the processor may further determine, based on the FTL mapping table, whether the SSD needs to perform the GC processing and/or the WL processing, and when determining that the SSD needs to perform the GC processing and/or the WL, may generate the I/O request used to indicate to perform GC processing and/or WL processing. It is ensured that all I/O requests sent by the processor to the SSD are the same as I/O requests actually processed by the SSD, so that after each to-be-processed I/O request is sent, the preset sleep duration of the processor is relatively accurate. In this way, after the sleep duration is preset, the processor can immediately query the processing result of the to-be-processed I/O request. This improves efficiency of finding the processing result by the processor, and reduces consumption of the resources of the processor.

Figure 6:
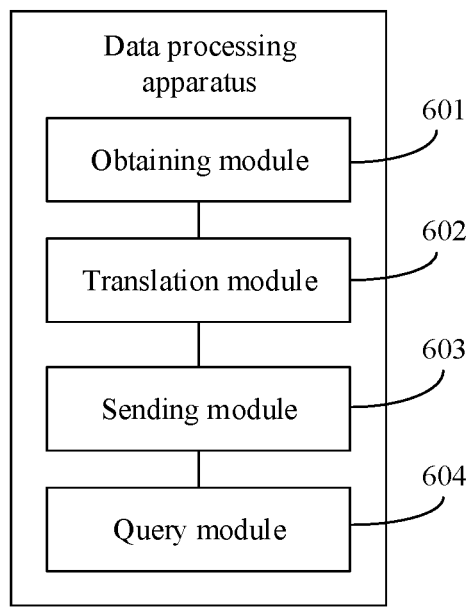
FIG. 6 is a schematic structural diagram of a data processing apparatus according to an embodiment of the present application.

FIG. 6 is a schematic structural diagram of a data processing apparatus according to an embodiment of the present application. The data processing apparatus may be applied to the processor 01 in the storage system shown in FIG. 1. As shown in FIG. 6, the data processing apparatus may include:

an obtaining module 601, configured to obtain a to-be-processed I/O request, where the to-be-processed I/O request includes a first address of to-be-read, to-be-written, or to-be-erased data, the first address is a logical address of the to-be-read, to-be-written, or to-be-erased data in a target solid-state drive SSD, and the target SSD is any one of n SSDs connected to the processor, where n≥1;

a translation module 602, configured to perform address translation on the to-be-processed I/O request based on a flash translation layer FTL mapping table, to translate the first address into a second address, where the second address is used to indicate a physical address of the to-be-read, to-be-written, or to-be-erased data in the target SSD, and the FTL mapping table is used to record a translation relationship between physical addresses and logical addresses in the n SSDs;

a sending module 603, configured to send, to the target SSD based on the second address, a to-be-processed I/O request obtained after address translation is performed; and a query module 604, configured to: after a sleep duration is preset, query a processing result of the to-be-processed I/O request.

In conclusion, in the data processing apparatus provided in this embodiment of the present application, before the sending module sends the to-be-processed I/O request to an SSD, the translation module has performed address translation on an I/O request based on the FTL mapping table. Therefore, after receiving the I/O request, the SSD does not need to perform address translation on the I/O request. This reduces a duration for processing each I/O request by the SSD, and reduces a probability that a duration required by the SSD to process the I/O request is longer than the sleep duration. Further, a probability that the processor needs to spend a relatively long time period repeatedly querying the processing result is reduced, and data processing efficiency is improved.

Optionally, the FTL mapping table is further used to record whether data is stored in storage pages in the n SSDs and whether the data stored in the storage pages is valid data. The obtaining module 601 may be configured to: after receiving a user I/O request, determine that the user I/O request is the to-be-processed I/O request; determine, based on the FTL mapping table, whether at least one SSD in the n SSDs currently needs to perform garbage collection GC processing; and when determining that an SSD in the at least one SSD needs to perform the GC processing, generate an I/O request used to indicate to perform GC processing on the SSD, and determine the generated I/O request as the to-be-processed I/O request.

Optionally, the FTL mapping table is further used to record a quantity of erasion times of storage blocks in the n SSDs. The obtaining module 601 may be configured to: determine, by the processor based on the FTL mapping table at an interval of preset duration, whether at least one SSD in then SSDs currently needs to perform wear leveling WL processing; and when determining that an SSD in the at least one SSD needs to perform the WL processing, generate, by the processor, an I/O request used to indicate to perform WL processing on the SSD, and determine the generated I/O request as the to-be-processed I/O request.

Figure 7:
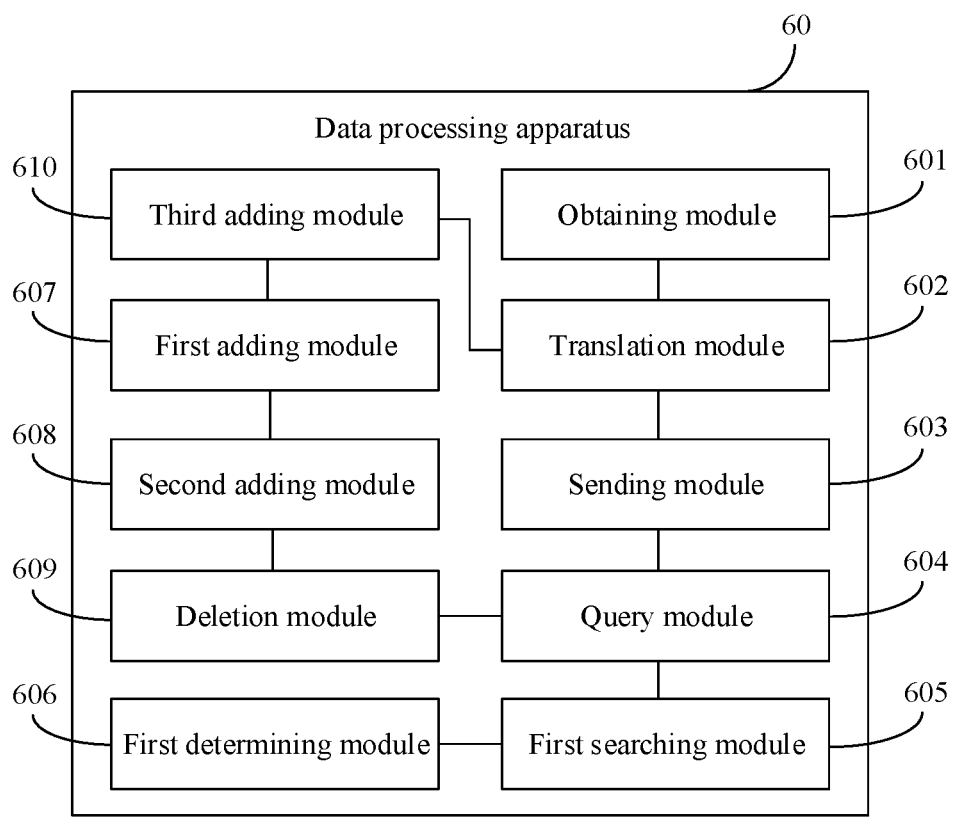
FIG. 7 is a schematic structural diagram of another data processing apparatus according to an embodiment of the present application.

Optionally, FIG. 7 is a schematic structural diagram of another data processing apparatus according to an embodiment of the present application. As shown in FIG. 7, based on FIG. 6, the data processing apparatus 60 may further include:

a first searching module 605, configured to: search preset durations corresponding to a plurality of request types for a duration corresponding to a type of the to-be-processed I/O request, where a duration corresponding to each request type is obtained through calculation based on a historical processing duration of an SSD for an I/O request of each request type;

a first determining module 606, configured to determine the duration corresponding to the type of the to-be-processed I/O request as the preset sleep duration.

a first adding module 607, configured to: before the to-be-processed I/O request obtained after address translation is performed is sent to the target SSD, add the to-be-processed I/O request to a preset sending queue, where the sending queue includes an I/O request to be sent to the SSD;

a second adding module 608, configured to: after the to-be-processed I/O request obtained after address translation is performed is sent to the target SSD, add an identifier of the to-be-processed I/O request to a preset query queue, where the query queue includes an identifier of a target I/O request that has been sent to the SSD and for which no processing result is found; and a deletion module 609, configured to: after the processing result of the to-be-processed I/O request is found, delete the identifier of the to-be-processed I/O request from the query queue.

Optionally, the first adding module 607 may be configured to: detect, by the processor, whether the to-be-processed I/O request meets a preset condition, where the preset condition includes: no I/O request that carries a same physical address as the to-be-processed I/O request exists in the sending queue; and when determining that the to-be-processed I/O request meets the preset condition, add, by the processor, the to-be-processed I/O request to the sending queue.

Optionally, a plurality of sending queues that one-to-one correspond to a plurality of request types and a plurality of query queues that one-to-one correspond to the plurality of request types are preset in the processor. The first adding module 607 may be configured to add the to-be-processed I/O request to a sending queue corresponding to a type of the to-be-processed I/O request. The second adding module 608 may be configured to add the identifier of the to-be-processed I/O request to a query queue corresponding to the type of the to-be-processed I/O request.

Optionally, the data processing apparatus 60 may further include a third adding module 610, configured to add the to-be-processed I/O request to a detection queue, where the detection queue includes the I/O request to be sent to the SSD. When the detection queue includes the I/O request used to indicate to perform GC processing and the user I/O request, the I/O request used to indicate to perform GC processing is placed in front of the user I/O request.

Figure 8:
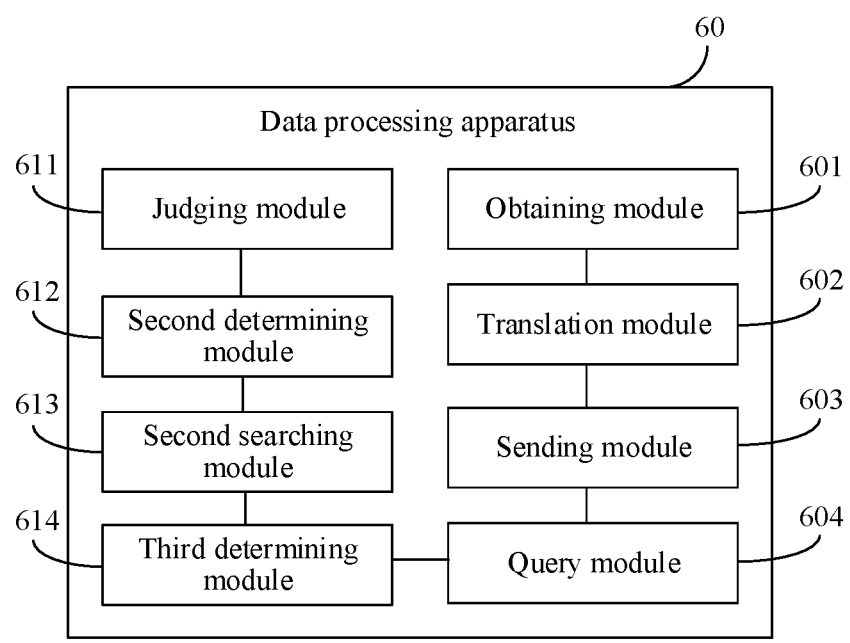
FIG. 8 is a schematic structural diagram of still another data processing apparatus according to an embodiment of the present application.

Optionally, FIG. 8 is a schematic structural diagram of still another data processing apparatus according to an embodiment of the present application. As shown in FIG. 8, based on FIG. 6, the data processing apparatus 60 may further include:

a judging module 611, configured to judge, based on the FTL mapping table, whether the target SSD needs to perform m pieces of preset processing before processing the to-be-processed I/O request, where the m pieces of preset processing include at least one of the GC processing and the WL processing, and m≥1;

a second determining module 612, configured to determine a request set based on a determining result, where the request set includes the to-be-processed I/O request, and when the determining result is that the target SSD needs to perform at least one piece of preset processing before processing the to-be-processed I/O request, the request set further includes an I/O request used to indicate to perform each of the at least one piece of preset processing on the target SSD;

a second searching module 613, configured to: search preset durations corresponding to a plurality of request types for a duration corresponding to a type of each I/O request in the request set, where the duration corresponding to each request type is obtained through calculation based on a historical processing duration of an SSD for an I/O request of each request type; and a third determining module 614, configured to: determine a sum of durations corresponding to types of all I/O requests in the request set as the preset sleep duration.

Optionally, the duration corresponding to each request type is an arithmetic mean or a weighted mean of the historical processing durations of the SSD for the I/O request of the request type.

In conclusion, in the data processing apparatus provided in this embodiment of the present application, before the sending module sends the to-be-processed I/O request to an SSD, the translation module has performed address translation on an I/O request based on the FTL mapping table. Therefore, after receiving the I/O request, the SSD does not need to perform address translation on the I/O request. This reduces a duration for processing each I/O request by the SSD, and reduces a probability that a duration required by the SSD to process the I/O request is longer than the sleep duration. Further, a probability that the processor needs to spend a relatively long time period repeatedly querying the processing result is reduced, and data processing efficiency is improved.

It should be noted that the data processing apparatuses shown in FIG. 6, FIG. 7, and FIG. 8 may all be applied to the processor, and functions implemented by each data processing apparatus may be the same as functions implemented by the FTL module in the protocol stack shown in FIG. 2.

All or some of the foregoing embodiments may be implemented by using software, hardware, firmware, or any combination thereof. When software is used to implement the embodiments, the embodiments may be implemented partially in a form of a computer program product. The computer program product includes one or more computer instructions. When the computer instructions are loaded and executed on a computer, the procedure or the functions according to the embodiments of the present application are all or partially generated. The computer may be a general-purpose computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line) or wireless (for example, infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium, a semiconductor medium (for example, a solid-state drive), or the like.

It should be noted that the method embodiment provided in the embodiments of the present application and the corresponding apparatus embodiments can be referenced to each other. This is not limited in the embodiments of the present application. It should be noted that a sequence of the steps of the method embodiment provided in the embodiments of the present application can be adjusted properly, and a step may also be added or removed according to a situation. Any modified method that can be readily figured out by a person skilled in the art without departing from a technical scope disclosed in the present application shall fall within the protection scope of the present application, and therefore details are not described.

The term "and/or" in the present application describes only an association relationship for describing associated objects and represents that three relationships may exist. For example, A and/or B may represent the following three cases: Only A exists, both A and B exist, and only B exists. In addition, the character "I" in this specification generally indicates an "or" relationship between the associated objects.

The foregoing descriptions are merely optional embodiments of this application, but are not intended to limit this application. Any modification, equivalent replacement, or improvement made without departing from the spirit and principle of this application should fall within the protection scope of this application.

What is claimed is:

1. A data processing method comprising:
obtaining, by a processor, a to-be-processed I/O request,
wherein the to-be-processed I/O request comprises a first address of to-be-read, to-be-written, or to-be-erased data,
wherein the first address is a logical address of the to-be-read, to-be-written, or to-be-erased data in a target solid-state drive (SSD), and
wherein the target SSD is any one of n SSDs connected to the processor, wherein n≥1;
obtaining, by the processor, a translated to-be-processed I/O request by performing address translation on the to-be-processed I/O request based on a flash translation layer (FTL) mapping table,
wherein the address translation translates the first address into a second address,
wherein the second address indicates a physical address of the to-be-read, to-be-written, or to-be-erased data in the target SSD, and
wherein the FTL mapping table is used to record a translation relationship between physical addresses and logical addresses in the n SSDs;
sending, by the processor and to the target SSD, based on the second address, the translated to-be-processed I/O request; and
after a preset sleep duration, querying, by the processor, a processing result of the translated to-be-processed I/O request, wherein the preset sleep duration is determined according to a type of the to-be-processed I/O request.

2. The method according to claim 1, wherein the FTL mapping table is further used to record whether data is stored in storage pages in the n SSDs and whether the data stored in the storage pages is valid data, and the obtaining the to-be-processed I/O request comprises:
after receiving a user I/O request, determining, by the processor, that the user I/O request is the to-be-processed I/O request;
determining, by the processor based on the FTL mapping table, whether at least one SSD in the n SSDs currently needs to perform garbage collection (GC) processing; and
in response to a determination that an SSD in the at least one SSD needs to perform the GC processing, generating, by the processor, an I/O request indicating to perform the GC processing on the SSD, and determining the generated I/O request as the to-be-processed I/O request.

3. The method according to claim 1, wherein the FTL mapping table is further used to record a quantity of erasing times of storage blocks in the n SSDs, and the obtaining the to-be-processed I/O request comprises:
determining, by the processor based on the FTL mapping table at an interval of preset duration, whether the at least one SSD in the n SSDs currently needs to perform wear leveling (WL) processing; and
in response to a determination that an SSD in the at least one SSD needs to perform the WL processing, generating, by the processor, an I/O request indicating to perform the WL processing on the SSD, and determining the generated I/O request as the to-be-processed I/O request.

4. The method according to claim 1, wherein before querying the processing result of the translated to-be-processed I/O request, the method further comprises:

searching, by the processor, preset sleep durations associated with a plurality of request types for a duration associated with the type of the to-be-processed I/O request,
wherein a preset sleep duration associated with each request type is obtained based on a historical processing duration of an SSD for an I/O request of each request type; and
determining, by the processor, the preset sleep duration associated with the type of the to-be-processed I/O request as the preset sleep duration.

5. The method according to claim 1, wherein before the querying the processing result of the to-be-processed I/O request, the method further comprises:
determining, by the processor based on the FTL mapping table, whether the target SSD needs to perform m pieces of preset processing before processing the to-be-processed I/O request, wherein the m pieces of preset processing comprise at least one of garbage collection (GC) processing and wear leveling (WL) processing, and m≥1;
determining, by the processor, a request set based on a determining result, wherein the request set comprises the to-be-processed I/O request, and in response to a determination that the target SSD needs to perform at least one piece of preset processing before processing the to-be-processed I/O request, the request set further comprises an I/O request indicating to perform each of the at least one piece of preset processing on the target SSD;
searching, by the processor, preset sleep durations associated with a plurality of request types for a duration associated with a type of each I/O request in the request set,
wherein the duration associated with each request type is obtained based on a historical processing duration of an SSD for an I/O request of each request type; and
determining, by the processor, a sum of durations associated with types of all I/O requests in the request set as the preset sleep duration.

6. The method according to claim 4, wherein the duration associated with each request type is an arithmetic mean or a weighted mean of the historical processing durations of the SSD for the I/O request of each request type.

7. The method according to claim 1, further comprising:
before sending the translated to-be-processed I/O request to the target SSD, adding, by the processor, the translated to-be-processed I/O request to a preset sending queue, wherein the sending queue comprises an I/O request to be sent to an SSD;
after sending the translated to-be-processed I/O request to the target SSD, adding, by the processor, an identifier of the translated to-be-processed I/O request to a preset query queue, wherein the preset query queue comprises an identifier of a target I/O request that has been sent to the SSD and for which no processing result is found; and
after finding the processing result of the to-be-processed I/O request, deleting, by the processor, the identifier of the to-be-processed I/O request from the preset query queue.

8. The method according to claim 7, wherein adding the translated to-be-processed I/O request to the preset sending queue comprises:
detecting, by the processor, whether the translated to-be-processed I/O request meets a preset condition, wherein the preset condition comprises: no I/O request exists in the sending queue that carries a same physical address as the translated to-be-processed I/O request; and in response to a determination that the translated to-be-processed I/O request meets the preset condition, adding, by the processor, the translated to-be-processed I/O request to the sending queue.

9. The method according to claim 7, wherein before adding the translated to-be-processed I/O request to the preset sending queue, the method further comprises:

adding, by the processor, the translated to-be-processed I/O request to a detection queue, wherein the detection queue comprises the I/O request to be sent to the SSD; and in response to the detection queue comprising an I/O request indicating to perform garbage collection (GC) processing and a user I/O request, placing the I/O request indicating to perform the GC processing in front of the user I/O request.

10. A storage system comprising a processor and n solid-state drives (SSDs), wherein the processor is configured to execute one or more instructions stored in a memory, and the processor implements the following operations:

obtaining a to-be-processed I/O request comprising a first address of to-be-read, to-be-written, or to-be-erased data, wherein the first address is a logical address of the to-be-read, to-be-written, or to-be-erased data in a target SSD, and wherein the target SSD is any one of the n SSDs connected to the processor, wherein n≥1;

obtaining a translated to-be-processed I/O request by performing address translation on the to-be-processed I/O request based on a flash translation layer (FTL) mapping table, wherein the address translation translates the first address into a second address, wherein the second address indicates a physical address of the to-be-read, to-be-written, or to-be-erased data in the target SSD, and wherein the FTL mapping table is used to record a translation relationship between physical addresses and logical addresses in the n SSDs;

sending, to the target SSD based on the second address, the translated to-be-processed I/O request; and after a preset sleep duration, querying a processing result of the translated to-be-processed I/O request, wherein the preset sleep duration is determined according to a type of the to-be-processed I/O request.

11. The storage system of claim 10, wherein the FTL mapping table is further used to record whether data is stored in storage pages in the n SSDs and whether the data stored in the storage pages is valid data, wherein the operations further include:

after receiving a user I/O request, determining that the user I/O request is the to-be-processed I/O request;

determining, based on the FTL mapping table, whether at least one SSD in the n SSDs currently needs to perform garbage collection (GC) processing; and in response to determining that an SSD in the at least one SSD needs to perform the GC processing, generating an I/O request used to indicate to perform the GC processing on the SSD, and determining the generated I/O request as the to-be-processed I/O request.

12. The storage system of claim 10, wherein the FTL mapping table is further used to record a quantity of erasing times of storage blocks in the n SSDs, wherein the operations further include:

determining, based on the FTL mapping table at an interval of preset duration, whether the at least one SSD in the n SSDs currently needs to perform wear leveling (WL) processing; and in response to determining that an SSD in the at least one SSD needs to perform the WL processing, generating an I/O request indicating to perform the WL processing on the SSD, and determining the generated I/O request as the to-be-processed I/O request.

13. The storage system of claim 12, wherein the operations further include:

searching preset sleep durations associated with a plurality of request types for a duration associated with the type of the to-be-processed I/O request, wherein a preset sleep duration associated with each request type is obtained based on a historical processing duration of an SSD for an I/O request of each request type; and determining the preset sleep duration associated with the type of the to-be-processed I/O request as the preset sleep duration.

14. The storage system of claim 10, wherein the operations further include:

determining, based on the FTL mapping table, whether the target SSD needs to perform m pieces of preset processing before processing the to-be-processed I/O request, wherein the m pieces of preset processing comprise at least one of garbage collection (GC) processing and wear leveling (WL) processing, and m≥1;

determining a request set based on a determining result, wherein the request set comprises the to-be-processed I/O request, and in response to determining the target SSD needs to perform at least one piece of preset processing before processing the to-be-processed I/O request, the request set further comprises an I/O request used to indicate to perform each of the at least one piece of preset processing on the target SSD;

searching preset sleep durations associated with a plurality of request types for a duration associated with a type of each I/O request in the request set, wherein the duration associated with each request type is obtained based on a historical processing duration of an SSD for an I/O request of each request type; and determining a sum of durations associated with types of all I/O requests in the request set as the preset sleep duration.

15. The storage system of claim 13, wherein the duration associated with each request type is an arithmetic mean or a weighted mean of the historical processing durations of the SSD for the I/O request of each request type.

16. The storage system of claim 10, wherein the operations further include:

before sending the translated to-be-processed I/O request to the target SSD, adding the translated to-be-processed I/O request to a sending queue, wherein the sending queue comprises an I/O request to be sent to an SSD;

after sending the translated to-be-processed I/O request to the target SSD, adding an identifier of the translated to-be-processed I/O request to a query queue, wherein the query queue comprises an identifier of a target I/O request that has been sent to the SSD and for which no processing result is found; and after finding the processing result of the translated to-be-processed I/O request, deleting the identifier of the translated to-be-processed I/O request from the query queue.

17. The storage system of claim 16, wherein the operations further include:

detecting whether the to-be-processed I/O request meets a preset condition, wherein the preset condition comprises: no I/O request exists in the sending queue that carries a same physical address as the translated to-be-processed I/O request; and in response to determining that the translated to-be-processed I/O request meets the preset condition, adding the translated to-be-processed I/O request to the sending queue.

18. The storage system of claim 17, wherein the operations further include:

adding the translated to-be-processed I/O request to a detection queue, wherein the detection queue comprises the I/O request to be sent to the SSD; and in response to the detection queue comprising an I/O request indicating to perform garbage collection (GC) processing and a user I/O request, placing the I/O request indicating to perform the GC processing in front of the user I/O request.

19. A non-transitory computer readable medium storing one or more instructions that, when executed by a processor, cause the processor to support the at least the following operations:

obtaining a to-be-processed I/O request comprising a first address of to-be-read, to-be-written, or to-be-erased data, wherein the first address is a logical address of the to-be-read, to-be-written, or to-be-erased data in a target solid-state drive (SSD), and wherein the target SSD is any one of the n SSDs connected to the processor, wherein $n \geq 1$;

obtaining a translated to-be-processed I/O request by performing address translation on the to-be-processed I/O request based on a flash translation layer (FTL) mapping table, wherein the address translation translates the first address into a second address, wherein the second address indicates a physical address of the to-be-read, to-be-written, or to-be-erased data in the target SSD, and wherein the FTL mapping table is used to record a translation relationship between physical addresses and logical addresses in the n SSDs;

sending, to the target SSD based on the second address, the translated to-be-processed I/O request; and after a preset sleep duration, querying a processing result of the translated to-be-processed I/O request, wherein the preset sleep duration is determined according to a type of the to-be-processed I/O request.

20. The non-transitory computer readable medium of claim 19, wherein the operations further include:

searching preset sleep durations associated with a plurality of request types for a duration associated with the type of the to-be-processed I/O request, wherein a preset sleep duration associated with each request type is obtained based on a historical processing duration of an SSD for an I/O request of each request type; and determining the preset sleep duration associated with the type of the to-be-processed I/O request as the preset sleep duration.

* * * * *